March 20, 1962 J. F. WAHL 3,026,430
VIBRATORY ELECTROMAGNETIC MOTOR
Filed Feb. 10, 1958 2 Sheets-Sheet 1
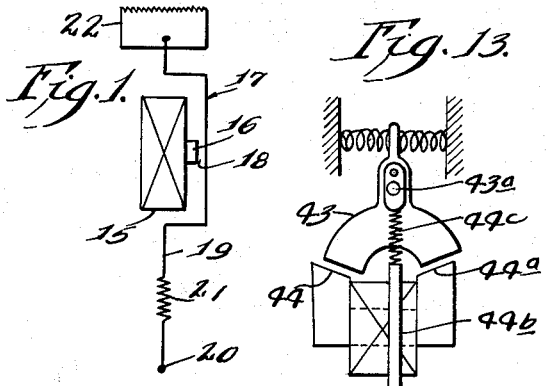
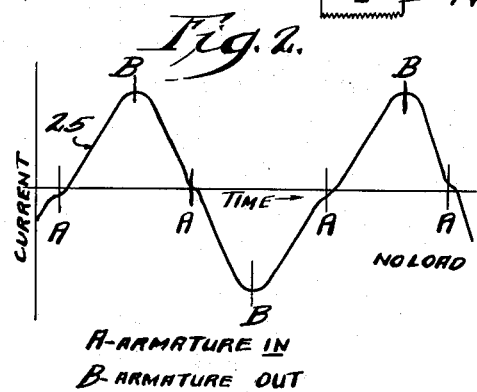
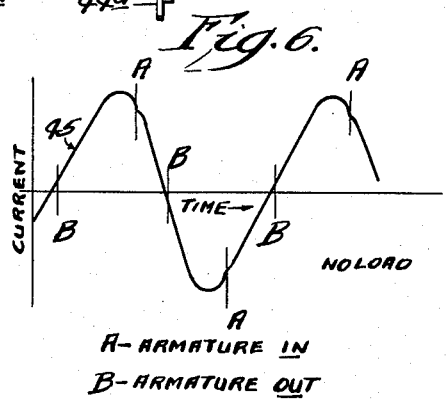
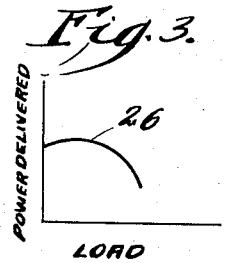
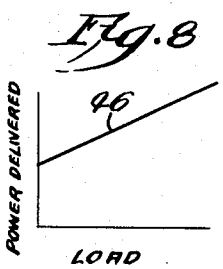
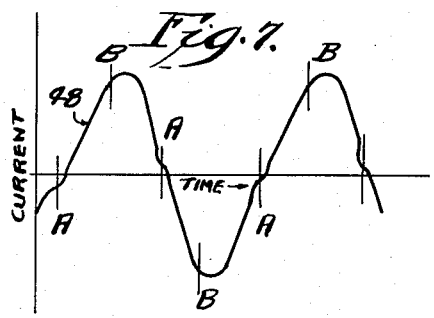
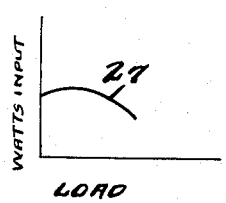
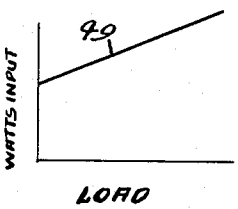
Inventor.
John F. Wahl.
By Zabel, Baker, York
Jones & Dithmar
Attorneys.

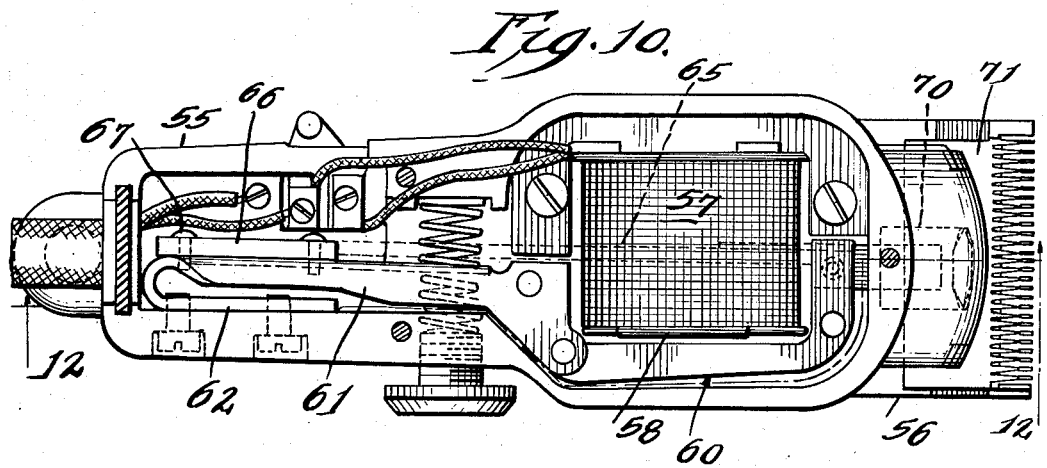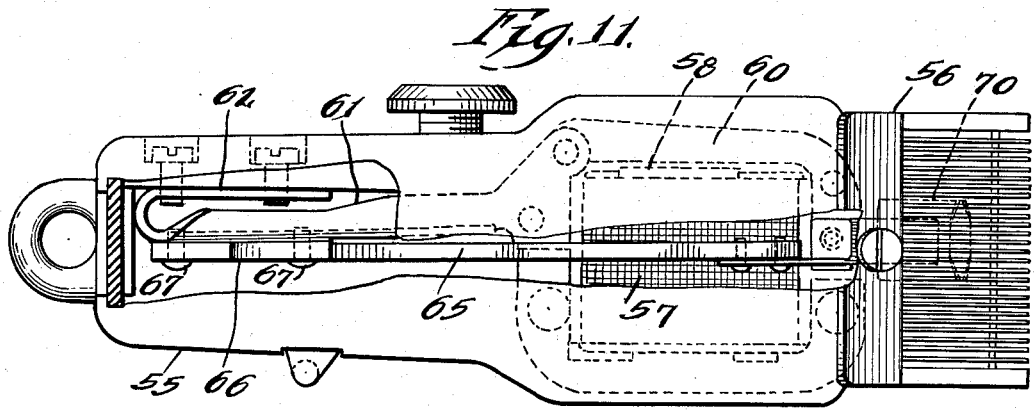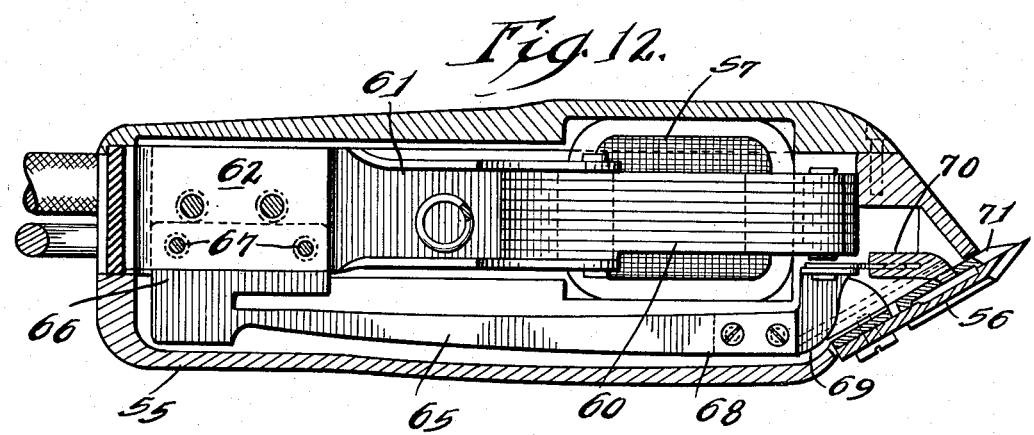

United States Patent Office 3,026,430
Patented Mar. 20, 1962

3,026,430
VIBRATORY ELECTROMAGNETIC MOTOR
John F. Wahl, Sterling, Ill., assignor to Wahl Clipper Corporation, Sterling, Ill., a corporation of Illinois
Filed Feb. 10, 1958, Ser. No. 714,429
11 Claims. (Cl. 310—29)

This is a continuation-in-part of U.S. Patent application Serial No. 502,971, filed April 21, 1955, now Patent No. 2,824,982, and entitled "Vibratory Electromagnetic Motor."

Vibratory electromagnetic motors are used extensively to power small hand tools such as hair clippers, dry shavers and the like. For convenience, the present motor will be described in connection with a hair clipper, but it is understood that the motor may be used in other apparatus.

Conventional vibratory electromagnetic motors have an electromagnet comprising a coil and associated core energized by a current of fixed frequency, for example, 60 cycles. A vibratory armature, mounted in spaced, effective relation with the core, carries a work element as for example the movable blade of a hair clipper. The armature, which forms a part of the magnetic circuit of the electromagnet, moves (vibrates or oscillates) in response to the varying magnetic field of the electromagnet, the permeability of the magnetic circuit varying with the travel path of the armature.

The natural tune frequency of the vibratory armature corresponds generally to a multiple of the frequency of the applied voltage, the two frequencies (natural tune of armature and voltage multiple frequency) being somewhat different in order to control the amplitude of armature vibration and to provide usable power. Usually the natural tune frequency of the armature is about 10% less than twice the current frequency. An armature having a natural time frequency which is less than twice the current frequency is here called an undertuned armature. If the natural tune frequency of an armature is greater than twice the current frequency the armature is here called overtuned.

A conventional motor of the aforesaid character has certain inefficient and undesirable characteristics, as will be seen. For example, the maximum instantaneous magnetic pull exerted on the undertuned armature occurs when the armature is near the point in its travel path which is most remote from the core. This point may be referred to as the "out" position of the armature. At the "out" position the space or gap between the core and the armature is a maximum. Because the gap is a maximum, a relatively high value current peak is required to force the maximum-pull flux across the gap. In view of this condition the power consumption of a conventional motor is relatively high and such motors must be larger and heavier than desirable.

When substantial load is encountered by a conventional electromagnetic motor, the armature amplitude is reduced and the power delivered by the motor decreases substantially. The watts input decreases at least 25% when the motor armature is stopped completely by a load. Thus, a conventional motor which draws eight watts when operating freely draws about six watts when operation stops due to excessive load. This poor power performance is particularly undesirable in hair clippers since the static friction between the lapped blade surfaces is high, and is a constant source of difficulty.

A conventional vibratory motor thus is inefficient in that when operating freely the watts input is substantially a maximum and when stalled, a minimum. Such a motor, therefore, must be designed for adequate heat dissipation based on heat developed during free or no load operation. The shortcomings of the motor are accentuated by the decrease in mechanical power delivered and by the decrease in watts input experienced when the motor encounters substantial load.

The present invention comprises a vibratory electromagnetic motor which effectively overcomes the aforesaid shortcomings of the conventional motor. The improved motor draws a minimum current under no load and a maximum current under full load. When operating freely under no load, the motor develops a maximum instantaneous magnetic pull on the armature when the armature is about at the point in its travel path which is nearest to the core. This point may be referred to as the "in" position of the armature. At this time the instantaneous current in the coil is close to maximum, but the space or gap between the core and the armature is a minimum. Because the gap is a minimum, only a relatively low value current peak is required to force the maximum-pull flux across the gap. Thus the average current and watts input are relatively low. This may be compared with the relatively high value current peak and high watts input required in a conventional motor wherein the maximum-pull flux occurs when the armature is "out" and the gap between the armature and the core is a maximum.

In addition, the operating characteristics of the improved motor are such that when mechanical load is encountered the power capabilities of the motor increase spectacularly. When near full load the motor delivers at least 100% more power than a conventional motor with the same normal-operation heat ratings.

When load is encountered the watts input of the motor increases, this increase being as much as 50% under conditions of maximum load. Such power and watts input increases are not accompanied by excessive heating in a practical sense for the reason that motors of this type normally do not operate under load conditions for extended periods of time. As soon as the load is withdrawn, the watts input immediately decreases to a lower value.

Another improved characteristic of the present motor is that it operates under no load condition without appreciable external vibration. Such a motor usually is incorporated in a manual appliance, e.g. hair clipper, dry shaver, etc., and freedom from external vibration is highly advantageous. In most conventional motors of this character external vibration is excessive and objectionable.

Still another improved characteristic of the present motor is that the effective stroke of the vibratory or oscillatory work delivering element can have a relatively large amplitude even though the air gap between the armature and core is desirably small, as will be seen.

Other features, advantages, characteristics and details of the invention will be apparent as the description proceeds, reference being had to the accompanying drawings which illustrate certain characteristics of a conventional motor and my improved motor as well as show one practical embodiment of the invention. It is to be understood that the description and drawings are illustrative only, and that the scope of the invention is to be measured by the appended claims.

In the drawings:

FIG. 1 is a diagrammatic illustration of a conventional vibratory electromagnetic motor;

FIG. 2 is a curve of instantaneous current vs. time which shows the related positions of the armature of the FIG. 1 motor, the curve being taken from a cathode ray oscilloscope;

FIG. 3 is an approximate curve showing the relationship between the power delivered by a conventional motor and mechanical load encountered by the motor;

FIG. 4 is an approximate curve showing the relationship between the watts input to a conventional motor and mechanical load encountered by the motor;

FIG. 5 is a diagrammatic illustration of a vibratory electromagnetic motor constructed in accordance with the present invention;

FIG. 6 is an oscilloscope curve of instantaneous current vs. time which shows the related positions of the armature of the FIG. 5 motor, the motor operating under no load condition;

FIG. 7 is an oscilloscope curve similar to that of FIG. 6, the motor operating under load conditions;

FIG. 8 is an approximate curve showing the relationship between the power delivered by the motor of FIG. 5 and mechanical load encountered by the motor;

FIG. 9 is an approximate curve showing the relationship between the watts input of a FIG. 5 motor and mechanical load encountered by the motor;

FIG. 10 is a plan view with the housing cover removed of a hair clipper using a vibratory electromagnetic motor embodying the invention;

FIG. 11 is a bottom view of the hair clipper of FIG. 10, a portion of the bottom being cut away to illustrate certain details of the motor;

FIG. 12 is a sectional view on irregular line 12—12 of FIG. 10;

FIG. 13 is a diagrammatic illustration in front view of a modified motor constructed in accordance with the invention, and FIG. 14 is a side view of a portion of the motor shown in FIG. 13.

Before describing the present invention in detail, it seems desirable to describe a conventional vibratory electromagnetic motor and refer briefly to its operating characteristics. In so doing, a better understanding of a motor embodying the invention and its improved operating characteristics will be obtained. Both the conventional motor and the motor embodying the invention will be described as applied to a hair clipper which, as is well known, has a stationary cutter blade and a cooperating movable cutter blade driven by a vibratory or oscillatory element of the motor.

Referring to FIG. 1, a conventional vibratory electromagnetic motor has a fixed coil 15 and a pole piece or core 16. A vibratory armature 17 is disposed in effective relation with core 16, an air gap 18 being present between the core and armature.

Armature 17 includes a resilient or elastic arm 19 which is anchored at 20 to a fixed support. The resilience of arm 19 is diagrammatically shown by spring convention 21. The free end of armature 17 actuates a work element 22 such as the movable blade of a hair clipper.

The assembly of armature 17, including resilient arm 19, and work element 22 has a predetermined natural tune frequency which corresponds generally to a multiple of the frequency (usually $2f$) of the voltage applied to coil 15. A certain difference in these two frequencies is necessary in order to confine the armature amplitude within safe limits and to provide usable power. This requirement is well known in the art. As an example, the natural tune frequency of the aforesaid assembly may be 110 when $2f$ of the applied voltage equals 120.

Referring to FIG. 2, the cathode ray oscilloscope curve 25 illustrates the wave shape of alternating current drawn by coil 15. The distortions appearing in curve 25 at the ordinate positions designated A indicate positions in the path of armature travel where armature 17 is nearest core 16. These positions are referred to as the armature "in" positions. The armature "out" positions on current curve 25 are designated B. From FIG. 2 it will be seen that the instantaneous current is substantially a minimum when the armature is "in," and substantially a maximum when the armature is "out."

Maximum flux or pull, of course, occurs when the instantaneous current is a maximum, and it is inefficient for these conditions to occur when the armature is "out" and there is a maximum gap 18 between core 16 and armature 17. The condition is inefficient because a relatively high current peak is required to force the maximum-pull flux across the maximum gap. In other words, a relatively high average current is required to operate a conventional motor and a ceiling on this current is imposed by design considerations of heat dissipation and safety.

As previously mentioned, when a conventional motor encounters load its mechanical power output decreases significantly. This characteristic is illustrated by curve 26 in FIG. 3.

FIG. 4 illustrates the decrease in watts input with load in most conventional motors of this type. A drop of 25% usually occurs when the armature is stopped completely.

In addition to the aforesaid shortcomings, conventional motor operation ordinarily is accompanied by excessive external vibration. This is objectionable in those instances where the motor is used in a manual tool such as a hair clipper, dry shaver, etc.

The improved vibratory electromagnetic motor of the invention is diagrammatically shown in FIG. 5, and FIGS. 6–9 are curves illustrating various characteristics thereof so they may be compared with those of the conventional motor of FIG. 1.

Referring to FIG. 5, the improved motor has a fixed coil 30 and a pole piece or core 31. An armature 32 of appreciable mass is disposed in effective relation with core 31, armature 32 including a resilient or elastic arm 33 mounted at fixed point 34. The resilience of arm 33 is diagrammatically indicated by spring convention 35. The space or gap between core 31 and armature 32 is designated 36.

Armature 32, including arm 33, has a natural tune frequency of vibration which is substantially different from a multiple frequency of the voltage applied to coil 30. Unlike armature 17 in the conventional motor, armature 32 in the improved motor does not directly engage and drive a work element, as will be seen.

The improved motor utilizes a second arm, namely arm 37, which is here called a "work arm." Work arm 37 has a resilient or elastic characteristic, as designated by spring convention 38, and it is mounted rigidly to armature arm 33 at an intermediate point 40. (This work arm may be mounted at any point on the armature which has movement.) The free end of work arm 37 engages and drives a work element 42 such as the movable blade of a hair clipper.

When the assembly of armature 32, work arm 37 and work element 42 is operating freely under no load, armature 32 is forced to vibrate at a frequency (usually 120 cycles per second) which is a multiple of the frequency of the applied voltage. In this respect the vibration of armature 32 is like that of armature 17 in the conventional motor previously described.

Unlike the conventional motor armature at no load, armature 32 when assembled with suitable work arm portion 37, has a predetermined natural tune frequency which is substantially different from a multiple of the frequency of the applied voltage. Thus armature 32 has only a small amplitude of vibration.

As will be seen, when work element 42 encounters a load, the natural tune frequency of armature 32 changes and approaches in value the multiple frequency of the applied voltage. Under this circumstance the amplitude of armature 32, instead of decreasing as in the case of the conventional motor, increases with the result that the mechanical power output of the motor increases spectacularly. This increase in mechanical power output under load conditions is, of course, highly advantageous.

In the motor shown in FIG. 5 the increased amplitude of armature 32 is limited by the space 36 provided between the armature and core 31. This limitation is avoided in a motor of modified design, as shown in FIG. 13, wherein armature 43, pivoted on shaft 43a oscillates back and forth with respect to pole faces 44 and 44a but can never engage them. In this modified arrangement, a resilient work arm 44b is rigidly connected to armature 43, the resilient characteristic of work arm 44b being shown by spring convention 44c. A work element 44d is carried at the free end of work arm 44b.

Referring again to FIG. 5, work arm 37 is driven in a vibratory manner by reaction to the vibration of armature 32. The direction of travel of work arm 37 under no load is opposite or nearly opposite to that of armature 32. These opposing movements tend to cancel one another so far as external vibrations are concerned, and hence a housing containing the motor is free of external vibration except when the motor is under heavy load and the armature is vibrating with large amplitude. Similar opposing movements occur with armature 43 and work arm 44b of the FIG. 13 modification.

Work arms 37 or 44b must have a natural tune frequency other than a multiple of the voltage frequency in order to confine the amplitudes thereof to safe limits under no load conditions. In one specific example the work arm 37 was under tuned with a natural tune frequency of 88 cycles per second under no load condition.

Under load conditions the presence of the work arm with its resilient characteristic has an effect on the tune frequency of the armature. In other words, a load produces a change in the armature tune frequency, so the new or load tune frequency is substantially different from the natural tune frequency under no load condition.

In FIG. 6, oscilloscope curve 45 shows the wave shape of current drawn by coil 30. The distortions appearing at the ordinates designated A indicate the points on the current cycles where armature 32 is at the points in its travel path closest to core 31. It will be noted that these distortions occur at or near the peaks in the current wave shape. This condition is to be compared with that of the conventional motor where the distortions occur at or near current minimums. Thus it will be seen that the improved motor when operating freely has a maximum flux or pull when the armature is approximately "in." Inasmuch as gap 36 between core 31 and armature 32 is a minimum when the armature is "in," it will be seen that a much smaller average current is required to operate the improved motor under no load condition. Thus, the watts input to the motor is correspondingly low. By varying the natural tune frequencies of armature 32 and work arm 37 it is possible to obtain the most desirable no load and full load operating characteristics.

It further will be noted from FIG. 6 that the current is substantially a minimum when the armature is "out," as indicated by the ordinates B. This, of course, is a highly efficient condition of operation.

When work element 42 encounters a load, the operating characteristics of the motor undergo certain changes, and if the spring characteristics or tune of the work element 42 and armature 32 are properly chosen there are changes in the relationship between the instantaneous current and armature positions as described below.

In addition, a load applied to work element 42 affects the natural frequency or tune of armature 32. For example, if the work arm 37 is undertuned so its natural frequency is 88 cycles/sec. under no-load, and if the natural frequency of the armature with the work arm 37 is around 130 cycles/sec., and the current is 60 cycle A.C., then the amplitude of vibration of the armature under no-load conditions will be rather small. In contrast to this situation, when a load is applied to work element 42, the natural frequency or tune of the armature 32 will approach resonance with the current so the armature will vibrate at a substantially greater amplitude. The increased amplitude of vibration of armature 32 causes work arm 37 to continue to vibrate, and this develops an increased mechanical power output at the work element 42. This increase is illustrated by curve 46 in FIG. 8, and the increase may be 100% or more.

A study of vibrating phenomenon, disregarding the effects of damping, will show that when the frequency of the applied force on an object is less than the natural frequency, the force and resultant motion are in phase. Applied to a conventional hair clipper, this would be a condition in which the armature is overtuned.

When the frequency of the applied force is higher than the natural frequency, the force is 180° out of phase with the resultant motion. This would be the usual case in which the armature of the conventional hair clipper is undertuned.

When the frequency of the applied force is equal to the natural frequency, the force is 90° ahead of the resultant motion. This holds true in all forced vibrations in which there is damping.

In the conventional electric hair clipper in which the armature is normally undertuned, if we assumed that there was no frictional damping, the armature would be 180° out of phase with the force which drives it. As seen in FIG. 2, the armature is "out" when the current reaches its peak.

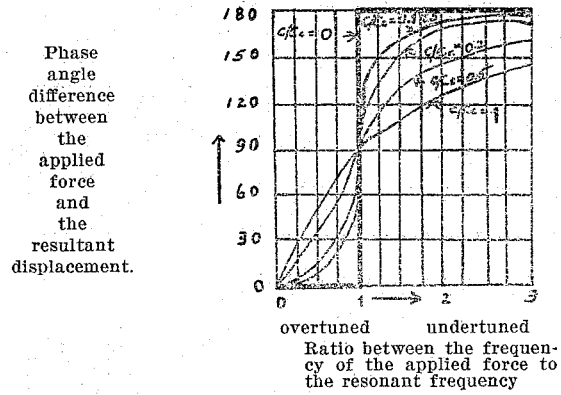

Phase angle difference between the applied force and the resultant displacement.

overtuned    undertuned
Ratio between the frequency of the applied force to the resonant frequency When frictional damping is considered the above diagram shows how the phase angle between the force and resultant displacement changes as a function of frequency for various values of damping. For no damping (see curve $C/C_c=0$) it will be seen that for ratio values between 0 and 1 (overtuned) the force and displacement are in phase, while for ratio values above 1 (undertuned), they are 180° out of phase. The phase angle curve therefore, shows a discontinuous jump at the resonance point. Whenever the vibrational system includes frictional damping, the phase angle difference between the applied force and the displacement at resonance is 90°, see all the curves in which $C/C_c \neq 0$.

In my improved electromagnetic motor here described, the vibrational movement of the magnetic armature is not governed by frictional damping forces. Thus it is possible for the armature to shift almost instantaneously from an in phase relationship with the driving force to a 180° phase difference with it. or vice versa, provided the natural frequency of the armature changes so it passes through the frequency of the applied force.

The work arm in this embodiment drives the movable cutting clipper blade, and consequently frictional damping forces do affect its motion. As stated previously, my work arm has a natural tune frequency which is less than the frequency at which it is driven. It thus is undertuned, and according to the curve previously set forth, it must be out of phase with the armature arm by at least 90°. To obtain all of the desirable features previously described the work arm would ideally operate at or near a 180° phase difference with the magnetic arm. In other words the work arm will be driven by reaction in a direction nearly opposite to the direction of the magnetic armature. It can be easily understood that various desirable effects can be obtained with a design in which the work arm portion operates at a phase difference which is less than 180° with respect to the magnetic armature. The work arm, which in effect is a resilient load responsive means, must be undertuned, that is it must have a natural frequency less than twice the frequency of the current energizing the motor, but the degree of undertuning and the amount of frictional damping of the load responsive means will determine the operating characteristics of the magnetic motor.

In view of these considerations, if the load applied to the motor with the undertuned work arm and the overtuned armature and work arm combination causes the tune or natural frequency of the armature to decrease until it passes through resonance and becomes slightly undertuned, the above described phase shift between the movement of the armature and the magnetic force will occur. This causes the movement of the armature relative to the core of the electromagnet to shift with respect to the peak magnitude of the current as can be seen by comparing curve 45 in FIG. 6 with the curve 48 shown in FIG. 7.

Curve 48 in FIG. 7 shows the relationship between the instantaneous current and the "in" and "out" position of armature 32 when work element 42 encounters a load. The distortions in curve 48 at ordinates A designate positions in the armature path closest to core 31, that is the armature "in" positions. It will be noted that these distortions occur when the instantaneous current is at or near a minimum. This change in phase relationship compared with conditions when the motor is operating freely, reduces the inductance of the electric circuit and permits an increase in the power input ranging to 50% or more. The curve 49 in FIG. 9 illustrates the increase in watts input with the increase in mechanical load encountered by the motor.

It also is important to note that the out of phase movement of the armature arm and the undertuned work arm causes the armature arm and the work arm to tend to counter-balance each other and minimize case vibration at no load on the work arm. Under load the armature arm increases its stroke, and thus case vibration is increased. This is a desirable effect in certain vibrating motors requiring case vibrations which increase with the load applied.

It can also be seen that in certain vibratory electromagnetic motors load can be applied to the work arm or resilient load responsive means in the form of movable mass, and that it is possible to have the work arm overtuned at no load. In this type of application of my improved motor, as load is applied the natural tune frequency of the work arm will be lowered in such a way that it will not become undertuned until nearly full load is applied. At the same time the magnetic armature will be overtuned at no load and light loads on the work arm, and change to a tune nearer to and below a multiple (120 cycles/sec.) of the current frequency as heavier loads are applied to the work arm.

From the foregoing it will be seen that the improved motor operates with extreme efficiency under no load conditions. Consequently the motor, in terms of mechanical power output, can be designed within approved, safe limits of power consumption when operating under no load. Such a motor, when load is encountered, desirably delivers increased power and consumes increased watts input, compared with the opposite in the case of conventional motors. Also, conventional motors operate inefficiently under no load conditions and hence cannot be designed to have power output capabilities comparable to the present motor.

FIGS. 10–12 illustrate an electric hair clipper having a motor embodying the present invention. The clipper includes a housing 55 having a stationary clipper blade 56 mounted at one end. Secured within housing 55 is an electromagnet comprising a coil 57 and an associated core 58.

An armature 60 having appreciable mass is mounted in effective relation with core 58, armature 60 including a resilient or elastic armature arm 61 which is secured to housing 55 at 62.

A resilient or elastic work arm 65 has end 66 rigidly mounted to armature arm 61, as for example by screws 67. Work arm 65 extends generally below and parallel to armature arm 61. The forward end 68 (FIG. 12) of work arm 65 carries a bracket 69 which in turn carries a finger 70. Finger 70 engages a movable clipper blade 71 which is mounted for cooperative action with fixed clipper blade 56.

When coil 57 is energized by A.C. current, armature 60 vibrates in response to the varying magnetic field of the electromagnet. As will be seen, armature 60 vibrates with small or medium amplitude when the clipper is operating freely, that is, when movable blade 71 does not encounter resistance. Work arm 65 is driven in a vibratory manner by reaction from the vibrations of armature 60, the work arm 65 traveling in directions nearly opposite to those of armature 60. The opposing directions, of course, minimize or eliminate external vibrations in housing 55. Finger 70 on work arm 65 vibrates with substantial amplitude and drives movable clipper blade 71.

When movable blade 71 encounters resistance, a change in the tune frequency of armature 60 is effected so that the tune frequency thereof is considerably closer to a multiple of the frequency of the voltage applied to coil 57. In this condition armature 60 vibrates with increased amplitude and as a result the mechanical power delivered to movable blade 71 increases. In addition, as previously mentioned, the electromagnet consumes increased wattage which aids in developing the aforesaid increased mechanical power output.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

1. A vibratory motor comprising a support, a coil energized by a current of fixed frequency mounted on said support, a magnetic circuit associated with said coil, an armature connected to said support and movable back and forth in said magnetic circuit in response to the varying magnetic field in said magnetic circuit, and a vibrating work contacting element, a spring system connecting said armature to said work contacting element, the characteristics of said spring system responsive to the work and selected so that under no load conditions the motion of said armature will be substantially in phase with the magnetic force of the coil and under load conditions the characteristics of the spring system will alter sufficiently to cause the displacement of the armature to be substantially out of phase with the magnetic force of the coil so that the vibratory motor will draw little power under no load and will draw increased power under load.

2. A vibratory motor comprising a core, said core having a pole face, a coil energized by a current of fixed frequency mounted on said core, a magnetic circuit associated with said coil, an armature associated with said core in spaced relation to a pole face thereon and movable back and forth in said magnetic circuit in response to the varying magnetic field in said magnetic circuit, and a vibrating work contacting element, a spring system connecting said armature to said work contacting element, the characteristics of said spring system responsive to the work and selected so that under no load the armature is in an approximate "in" position with respect to the pole face of the core when the current is at a maximum, and under load the armature shifts so it is in an approximate "out" position with respect to the pole face of the core when the current is at a maximum, whereby the vibratory motor will draw little power under no load and will draw increased power under load.

3. In a vibrating electromagnetic motor a core, said core having a pole face, an electromagnetic coil mounted on said core and energized by a current of fixed frequency, an associated magnetic circuit, a portion of said magnetic circuit resilient and in spaced relation to said pole face and movable in response to the varying magnetic field of said electromagnet, said movable portion employing resilient load responsive means, said resilient load responsive means being undertuned at least under some condition of loading and connected to said movable portion of the magnetic circuit, the spring constants of said resilient movable portion selected so that under no load said movable portion of the magnetic circuit is overtuned, and when substantial load is applied to said load responsive means the tune of said movable portion of the magnetic circuit changes to a value near resonance changes to a value nearer resonance.

4. In a vibratory electromagnetic motor, a coil energized by a current of fixed frequency, a magnetic circuit associated with said coil, said magnetic circuit including an armature movable in response to the varying magnetic field in said magnetic circuit, and a vibratory load responsive means, undertuned at least under full load, having a spring connected relationship with said armature and driven by reaction therefrom, the spring constant of said armature selected so that under no load the assembly of armature and load responsive means is overtuned.

5. In a vibratory electromagnetic motor, a coil energized by a current of fixed frequency, a magnetic circuit associated with said coil, said magnetic circuit including a magnetic circuit portion of vibratory characteristic, a work contacting element and an undertuned resilient vibratory load responsive driving means associated with said portion, said work contacting element under at least some conditions of loading being driven by said portion through said load responsive driving means by reaction in direction at least 90 degrees out of phase with said portion.

6. In a vibratory electromagnetic motor, a core having a pole face, a coil mounted on said core and energized by a current of fixed frequency to form an electromagnet, a vibratory armature in effective spaced relation with said pole face and forming part of the magnetic circuit of said electromagnet, an undertuned vibratory work arm having a spring connected relationship with said armature, the weight and natural frequency of said armature selected so the natural frequency of the combination of said armature and said work arm is greater than twice the frequency of the current whereby under no load condition the spacing between said armature and said pole face is a minimum when the current is a maximum and changes under load conditions so the said spacing is a maximum when the current is a maximum, whereby the motor draws little power under no load condition and draws increased power under load conditions.

7. In a vibratory electromagnetic motor, a core having a pole face, a coil energized by a current of fixed frequency mounted on said core, a magnetic circuit associated with said coil, said magnetic circuit including an armature in spaced relation to said pole face and movable back and forth in said magnetic circuit in response to the varying magnetic field in said magnetic circuit, a vibrating work contacting armature driven element and an undertuned load responsive means connecting said work contacting element to said armature, the weight and natural frequency of said armature selected so the natural frequency of the combination of said load responsive means, said armature driven element and said armature is greater than twice the frequency of the current whereby under no load condition the spacing between said armature and said pole face is a minimum when the current is a maximum and changes under load conditions so said spacing is a maximum when the current is a maximum, whereby the motor draws little power under no load and draws increased power under load.

8. In a vibratory electromagnetic motor, a core having a pole face, a coil energized by a current of fixed frequency mounted on said core, a magnetic circuit associated with said coil, said magnetic circuit including an armature in spaced relation to said pole face and movable back and forth in said magnetic circuit in response to the varying magnetic field in said magnetic circuit, a vibrating work contacting armature driven element and an undertuned load responsive means both for connecting said work contacting element to said armature and for reducing vibrations in said core during operation of the motor, the weight and natural frequency of said armature selected so the combination of said load responsive means, said armature driven element, and said armature has a natural frequency which is greater than twice the frequency of the current whereby under no load condition the spacing between said armature and said pole face is a minimum when the current is a maximum and changes under load conditions so the said spacing is a maximum when the current is a maximum, whereby the motor draws little power under no load and draws increased power under load.

9. In a vibratory electromagnetic motor, a coil energized by a current of fixed frequency, a magnetic circuit associated with said coil, said magnetic circuit including an armature movable back and forth in response to the varying magnetic field in said magnetic circuit, and a vibratory work arm having a spring connected relationship with said armature, said work arm being driven by said armature by reaction in direction opposite to said armature, said armature under no load on said work arm having a natural tune frequency substantially different from a multiple of said current frequency, said armature changing in tune frequency toward a multiple of said current frequency in response to load applied to said work arm.

10. In a vibratory electric motor, an electromagnet, a vibratory armature in effective relation with said electromagnet, a vibratory work arm having a spring connected relationship with said armature, said work arm being driven by said armature in direction opposite to said armature, said armature and said work arm respectively having masses which effectively counterbalance each other so as to eliminate external vibration.

11. In a hair clipper, a vibratory electromagnetic motor comprising a core, said core having a pole face thereon, a coil mounted on said core and energized by a current of fixed frequency, a resilient vibratory armature mounted at one end on said hair clipper with its opposite end in effective spaced relation to said pole face, an undertuned resilient vibratory work arm connected at one end to a vibrating part of said armature, the other end of said vibrating work arm adapted to be connected to a movable cutting blade, the natural tune frequency of the combination of said armature and said work arm greater than twice the frequency of the current energizing said coil whereby the spacing under no load condition between said armature and said pole face is a minimum when the current is a maximum and changes under load conditions so the said spacing is a maximum when the current is a maximum, whereby the motor draws little power under no load condition and draws increased power under load conditions.

References Cited in the file of this patent
UNITED STATES PATENTS

| | | |
|---|---|---|
| 2,251,419 | Prescott | Aug. 5, 1941 |
| 2,259,131 | Fleischer et al. | Oct. 14, 1941 |
| 2,741,711 | Meyerink | Apr. 10, 1956 |

FOREIGN PATENTS

| | | |
|---|---|---|
| 112,717 | Australia | Mar. 13, 1941 |
| 1,003,268 | France | Nov. 14, 1951 |